Sept. 13, 1966  W. C. PARENTI  3,273,111
APPARATUS FOR MEASURING THE VELOCITY OF ACOUSTICAL WAVES
Filed Aug. 3, 1964  2 Sheets-Sheet 1
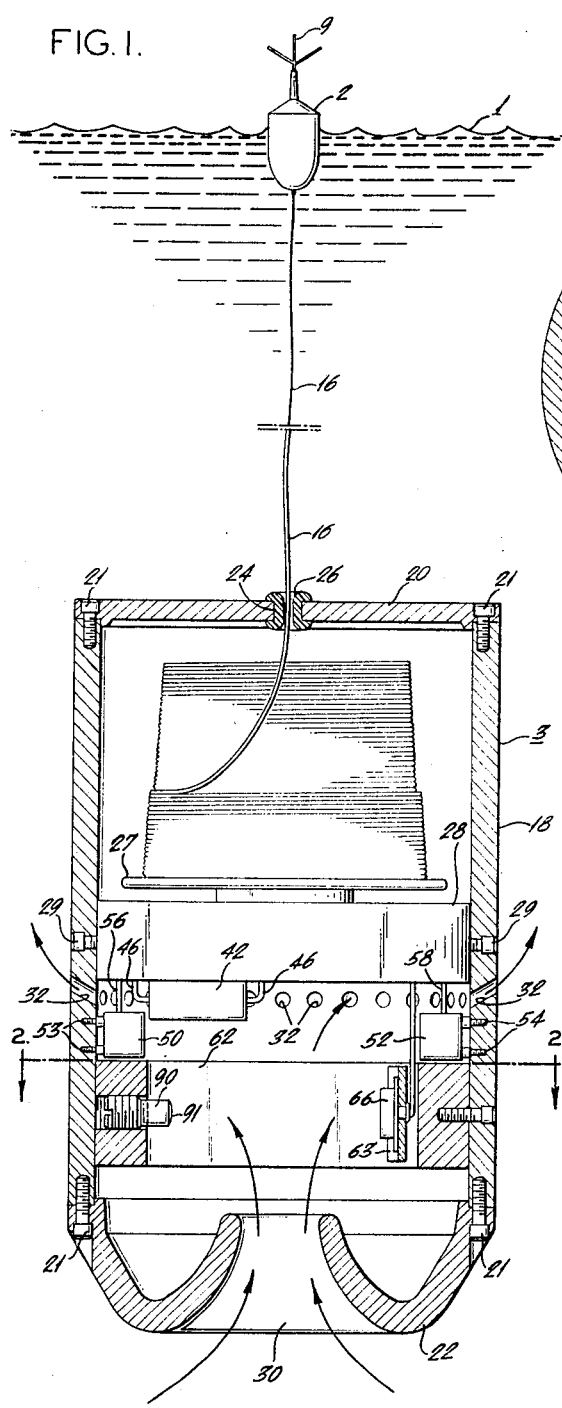
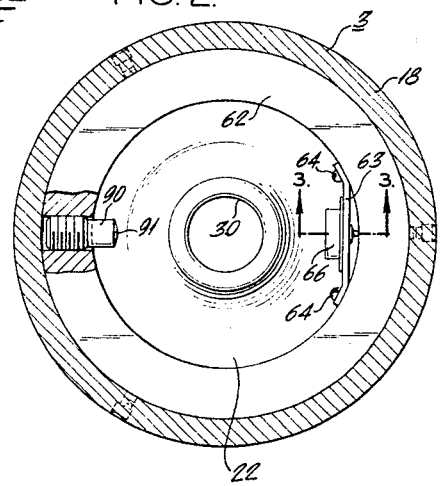
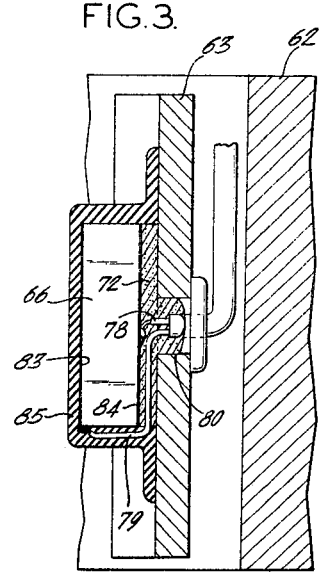
INVENTOR:
WILLIAM C. PARENTI
BY Howson & Howson Sept. 13, 1966  W. C. PARENTI  3,273,111
APPARATUS FOR MEASURING THE VELOCITY OF ACOUSTICAL WAVES
Filed Aug. 3, 1964  2 Sheets-Sheet 2
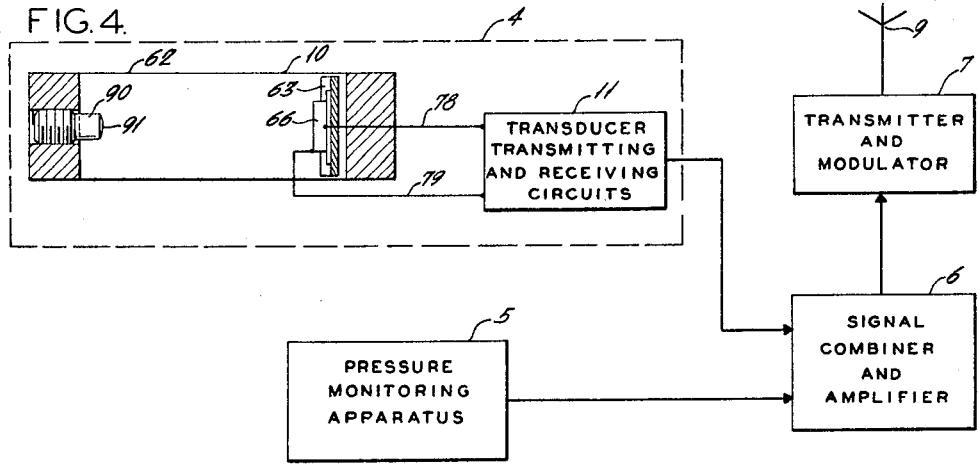
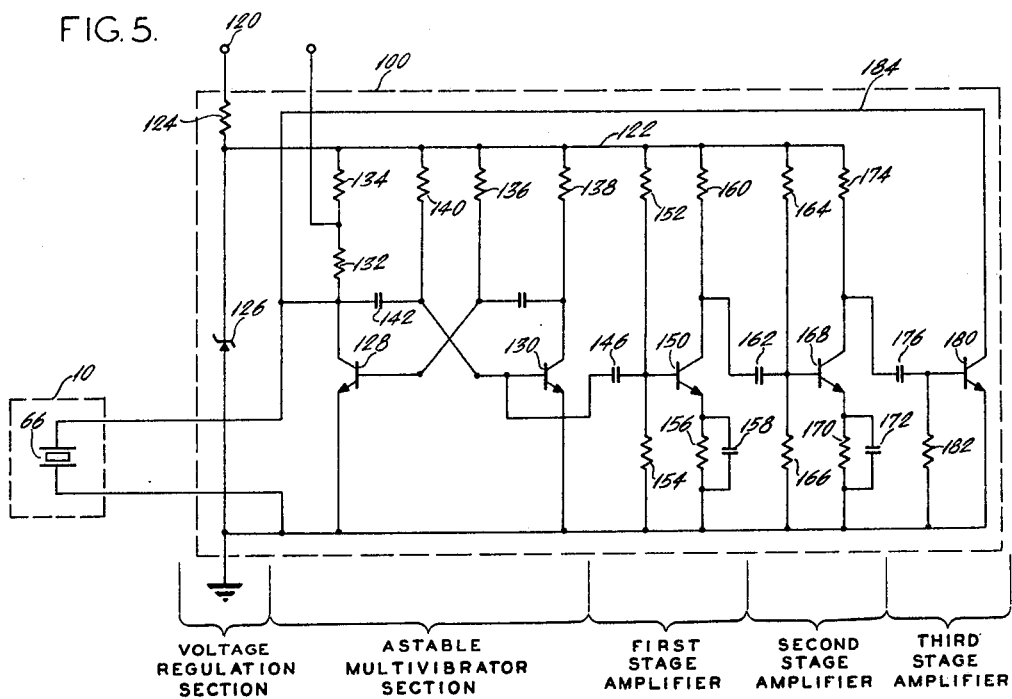
INVENTOR:
WILLIAM C. PARENTI
BY Howson & Howson
ATTYS.

United States Patent Office 3,273,111
Patented Sept. 13, 1966

3,273,111
APPARATUS FOR MEASURING THE VELOCITY OF ACOUSTICAL WAVES
William C. Parenti, Philadelphia, Pa., assignor to American Bosch Arma Corporation, Philadelphia, Pa., a corporation of New York
Filed Aug. 3, 1964, Ser. No. 386,890
9 Claims. (Cl. 340—5)

The present invention relates to apparatus for measuring the velocity of acoustical waves, and particularly to systems suitable for measuring the velocity of acoustical waves at different depths in water.

There are many applications in which it is desirable to be able to measure the velocity of acoustical waves in a medium; for example, with a known medium such as water the velocity of acoustical waves therein varies in known proportion to the temperature of the water, and the water temperature can therefore be determined by measuring the acoustical wave velocity. Such information as to water temperature at various depths in the ocean is especially significant in connection with operation of sonar equipment, for the reason that a layer of water having a temperature markedly different from that of the adjacent water will also have a markedly different density and will therefore produce strong refraction of sonar waves impingent thereon. Such refracting layers can be detected by means of apparatus which is capable of measuring the velocity of acoustical waves at various depths beneath the surface of the water.

In the prior art, systems have been designed to determine the velocity of acoustical waves in water by using two transducers, one for emitting a pulse of acoustical energy into the water and a second located in the water in the path of the emitted pulse for receiving the pulse and producing an electrical signal representative thereof. In these systems, for each pulse received by the second transducer a new pulse is emitted by the first transducer a predetermined time after each pulse reception. The frequency of recurrence of the emitted pulses is then proportional to the velocity of the acoustical energy in the water, which in turn is proportional to the temperature of the water at that depth. Since in the normal usage the systems placed in the water are not readily retrievable, loss of the systems has involved considerable expense. Also, the velocity indications produced by these systems have not been as accurate as desirable for the reason that changes in motion of the water between the emitting and receiving transducers normally occurs, and such changes in motion produce changes in velocity of the acoustical waves with respect to the transducers and hence produce indications of changes in temperature when none are actually present. Turbulence of the water flow in the region between the transducers has also produced confusing variations in the indications produced by such prior art systems.

Accordingly, it is an object of the present invention to provide new and useful apparatus for measuring the velocity of acoustical waves in a medium.

Another object is to provide such apparatus which is capable of reliable operation to provide accurate measurements.

A further object is to provide such apparatus which is compact and inexpensive to manufacture.

It is also an object to provide such apparatus which produces cancellation of the undesired effects of motion of the medium along the direction of the acoustical waves.

Still another object is to provide such apparatus especially suited for use in water which will reduce turbulence in the water through which the acoustical waves travel.

In accordance with the present invention, these and other objects are achieved by providing an electro-acoustical transducer which is mechanically coupled to the medium in which the acoustical velocity is to be measured and which is supplied with a series of time-spaced electrical pulses so as to emit a corresponding series of time-spaced acoustical pulses into said medium; an acoustical reflector is mounted at a predetermined distance from the transducer and in the path of the emitted acoustical pulses so as to reflect the acoustical pulses back to said transducer, which responds thereto to produce a corresponding series of electrical control pulses. These control pulses are used to control the times of occurrence of the electrical pulses applied to the transducer. Preferably, an electrical pulse is applied to the transducer a predetermined time after each control pulse is produced. The frequency of the series of electrical pulses varies with and constitutes an accurate indication of the velocity of the acoustical waves in the medium and also of the temperature of the medium as explained above.

Preferably the series of electrical pulses is produced by a circuit which generates electrical pulses even though control pulses are absent, although with a greater time-spacing between generated pulses than when control pulses are present, so as to assure initial production of electrical pulses when operation first begins or is resumed.

In the preferred form in which the apparatus is used to measure acoustical-wave velocity as it sinks to different depths in water, provision is made to produce smooth flow of water through the region between transducer and reflector without substantial turbulence. Preferably also, the reflector has a convex surface from which reflection occurs.

The use of one transducer, as opposed to two, makes the apparatus less expensive and more compact. The arrangement also reduces errors due to motion of the medium along a line joining the transducer and reflector, since any changes in apparent velocity of the acoustical waves due to this effect while traveling from transducer to reflector are cancelled while traveling from reflector to transducer.

For a better understanding of these and other features and advantages of the present invention, reference is made to the following detailed description and the accompanying drawings, in which:

FIGURE 1 is a schematic representation, partly in section, illustrating an overall system in use, in accordance with a preferred form of the present invention;

FIGURE 2 is a sectional view of the transducer section of the present invention taken along line 2—2 of FIGURE 1;

FIGURE 3 is a sectional view taken along line 3—3 of FIGURE 2;

FIGURE 4 is a block diagram illustrating the overall system of the present invention; and FIGURE 5 is an electrical schematic diagram illustrating one form of apparatus suitable for use as the transducer transmitting and receiving circuits of FIGURE 4.

Referring now to the embodiment of the invention illustrated in FIGURE 1, this embodiment of the invention is intended for use below the surface of a body of water 1, and in this example it will be assumed that the water is salt water. The entire system shown is designed to be dropped into the water. One portion of the system comprises a buoy 2 floating on the surface of the water; a second portion, shown in section in FIGURE 1, comprises a housing 3 of metal for containing the remainder of the apparatus of the overall system.

As can be seen in the block diagram of FIGURE 4, the overall system comprises functionally an apparatus 4 for measuring the velocity of acoustical waves, a pressure monitoring apparatus 5, a signal combiner and amplifier 6 receiving the output of apparatuses 4 and 5, a transmitter and modulator 7 receiving the output of the signal combiner and amplifier 6, and an antenna 9 for radiating the modulated signal of the system. The apparatus for measuring the velocity of acoustical waves 4 comprises a transducer section 10 and transducer transmitting and receiving circuits 11.

The output of the apparatus 4 provides a signal, the frequency of which is an indication of the velocity of acoustical waves in the water, from which information the temperature of the water can be determined. The output of the pressure monitoring apparatus 5 provides a signal, the frequency of which is an indication of the pressure of the water at the particular depth at which it is located, and from this information this depth can be determined. The outputs of apparatuses 4 and 5 are combined and amplified in the signal combiner and amplifier 6 and this combined signal is conducted to transmitter and modulator 7 where it is modulated on a carrier wave and radiated from antenna 9 to a receiving station at which the information is to be used.

Referring back to FIGURE 1, the buoy 2 contains the transmitter and modulator 7 of FIGURE 4 and supports antenna 9 above the surface of the water 1. The housing 3 contains the apparatuses 4 and 5 and the signal combiner and amplifier 6.

As the housing 3 sinks into the water, information is radiated from the antenna 9 as to the pressure of the water and velocity of acoustical waves through the water at the location of the housing. The information from the housing is relayed to the buoy by means of insulated conductor 16.

The housing 3, which is a standard sonobuoy modified for the purposes of the present invention, comprises a cylindrical hollow portion 18 closed by end plates 20 and 22 at its upper and lower ends, respectively. The end plates are held to the cylindrical portion by means of screws 21. End plate 20 has a central aperture 24 with an annular gasket 26 mounted therein to permit conductor 16 to slip therethrough. The conductor 16 is wound on a spool 27 located in the upper portion of the housing 18 and mounted to chassis 28, which is held stationary in housing 18 by screws 29. As the housing 3 sinks into the water, conductor 16 unwinds from spool 27 and slides through the opening gasket 26, thereby providing continuous electrical connection between the housing and the buoy.

The end plate 22 of the housing 3 extends downwardly from the lower end of the circular periphery of housing portion 18, to which it is bolted, and has a gradually inwardly turned central portion to provide an aperture 30 through its center to permit water to flow therethrough into the housing. The water which enters the lower portion of the housing through aperture 30 is exhausted through upwardly-extending ports 32 located around, and approximately midway of, central housing portion 18.

Water-tight chassis 28 is mounted in the housing above ports 32 and contains the electronic circuitry for the signal combiner and amplifier, the transducer transmitting and receiving circuits, and the pressure monitoring electrical circuits. Fixedly mounted on the lower side of chassis 28 is the pressure-sensing apparatus 42, which may be of conventional form and which responds to changes in water pressure to produce an electrical voltage proportional thereto. The output of the pressure-sensing apparatus is connected to the electronic pressure-monitoring section in chassis 28 by means of electrical leads 46.

Batteries 50 and 52 are mounted below the chassis 28 and the pressure-sensing apparatus 42 and are held to the inner side walls of the housing portion 18 as by means of screws 53 and 54, respectively. The batteries may be of the type which supply electrical power only when exposed to salt water. The batteries are connected to the electrical circuitry in the chassis to supply power thereto by way of insulated conductors 56 and 58, respectively.

The transducer section 4 of FIGURE 4 is located in the bottom portion of housing 3 shown in FIGURE 1, below batteries 50 and 52. The transducer section emits and receives acoustical waves to provide indication of the velocity of the acoustical waves in the water.

As seen in FIGURES 1, 2 and 3, transducer section comprises an annular support 62, to which is mounted a non-conductive plate 63, which may be made of fiberglass or the like. The plate 63 has a central flat portion and its sides bent to conform to the cylindrical wall of the support. The plate is mounted to the support by screws 64 through the bent sides of the plates.

As can be seen more clearly in the sectional view of FIG. 3, the plate 63 supports a crystal transducer 66 which is preferably a piezoelectric polycrystalline crystal, and may be made of barium titanate. Typically the transducer has a resonant frequency of approximately 1 or 2 megacycles. The crystal transducer is mounted to the non-conductive plate 63 by means of a suitable cement 72, which may be an epoxy cement. Electrical leads 78 and 79 which supply the electrical pulses for deforming the crystal are brought through an opening 80 in plate 63, one to the rear and one to the front of the crystal, and are there connected to metal coatings 83 and 84, respectively, on opposite faces of the crystal. The leads 78 and 79 extend to the electronic section in chassis 28 as shown in FIG. 1.

In order to isolate the crystal and metal coatings from the effects of the sea water with its high salinity, an appropriate coating 85, such as polyurethane rubber, is used to cover the crystal transducer and seal it to plate 63. This rubber coating 85 should have an acoustical impedance consistent with providing good acoustical coupling between the crystal transducer and the salt water comprising the medium through which the acoustical waves travel.

A reflector 90 is mounted in the cylindrical support 62 diametrically opposite the crystal transducer 66, so that acoustical waves produced by the crystal transducer, will be directed toward the reflector 90, then will be reflected thereby, and will then proceed back to the crystal to deform it mechanically and thereby produce an electrical control pulse. The reflector 90 is shown in FIGS. 1 and 2 in the form of a screw threaded in the support 62 and having a convex reflecting surface. The reflector by this arrangement provides convenient adjustment of the gauge length between the crystal transducer and reflector as desired. The reflecting surface 91 of reflector 90 has a convex shape in order to minimize secondary reflections and provide a point source reflecting means for making the reflected pulses sharper. In this manner, the reflected pulses received by the crystal will accurately and precisely represent the period of travel of the acoustical wave between the crystal and reflector. However, in other embodiments of the invention the face of the reflector may be made flat if desired.

In the operation of the transducer section of FIG. 1, as the housing 3 enters the water, water flows in through openings 30 and out through ports 32. When the batteries 50 and 52 become submerged they supply the power to operate the electronic section in chassis 28. As the housing sinks into the water, the crystal transducer 66 is pulsed by a generated electrical pulse to deform, thereby launching an acoustical pulse which is transmitted through the water to reflector 90, where the acoustical pulse is then reflected back to the crystal transducer. The reflected acoustical pulse received by the crystal transducer 64 deforms the crystal transducer and thereby produces an electrical control pulse which causes another electrical pulse to be applied to the crystal transducer to launch the next acoustical pulse. By this arrangement, a new acoustical pulse is launched by the crystal transducer each time a reflected acoustical pulse is received by the crystal transducer. The frequency of recurrence of the pulses is proportional to the velocity of the waves in the water at the particular depth of the housing 3 at that instant. Thus, from a knowledge of the pulse recurrence frequency the velocity of the waves through the water, and hence the temperature of the water, can be calculated. At the same time the pressure-sensing apparatus 42 is used to determine the depth of the housing 3 in the water at the instant the frequency of recurrence of the generated pulses is measured. In this way information is provided as to the temperature of the water at various particular depths as the housing 3 sinks through the water.

FIG. 5 illustrates the details of the transducer transmitting and receiving circuits 11 and the transducer section 10 of FIGURE 4. The transducer section 10 is shown schematically with crystal transducer 66 represented therein. The transducer transmitting and receiving circuits comprise a section of voltage regulation, an astable multivibrator section, and three stages of power amplification.

The voltage regulation section comprises an input terminal 120 connectable to a direct current source of power, which may be on the order of 11 to 14 volts, and is regulated to produce a desired voltage at supply line 122 by resistor 124 and zener diode 126. The source of power in the present example comprises batteries 50 and 52, shown in FIGURE 1.

The astable multivibrator section of FIGURE 5 comprises a standard astable multivibrator having common emitter-connected transistors 128 and 130. Transistor 128 has collector load resistors 132 and 134 connected in series to supply line 122 and a base bias resistor 136 connected to supply line 122. Conventional capacitive coupling is provided between the base of transistor 128 and the collector of transistor 130. Transistor 130 is connected similarly to transistor 128, having a collector load resistor 138, connected to supply line 122 and a base biasing resistor 140 connected between its base and supply line 122, with capacitor 142 connected between the base of transistor 130 and the collector of transistor 128.

The base of transistor 130 is capacitively coupled through capacitor 146 to the first stage of power amplification, which is connected as a common emitter transistor amplifier. The first stage comprises a transistor 150 having its base biased by a voltage divider made up of resistors 152 and 154 connected between supply line 122 and electrical ground. The transistor 150 has an emitter bias resistor 156 and a bypass capacitor 158 across resistor 156 to provide maximum gain of the stage at high frequencies, and has a collector load resistor 160 connected to power line 122. The first stage of amplification is designed as a threshold detector to detect and amplify pulses which have an amplitude beyond a predetermined level. The stage exerts a rectifying action to provide a negative-going output in response to the input pulse.

A capacitor 162 couples the output of the first stage of amplification from the collector of transistor 150 to the second stage of amplification, which is connected essentially the same as the first stage previously described. In particular, the second stage amplifier comprises transistor 168 connected in a common-emitter circuit having its base biased normally on by a voltage divider of resistors 164 and 166 connected between supply line 122 and electrical ground. Transistor 168 has an emitter bias resistor 170, a bypass capacitor 172 connected across resistor 170, and a collector load resistor 174 connected to supply line 122.

Output from the collector of transistor 168 is coupled through capacitor 176 to the third stage of amplification, which acts as an electronic switch. The third stage comprises transistor 180 connected in common-emitter circuit, having its emitter connected to ground, its base provided with bias resistor 182 and its collector connected in a feedback loop 184 to the collector of transistor 128 in the astable multivibrator section. The transistor switch 180 turns on for the duration of a received positive pulse from the second stage of amplification, and, through the feedback loop, then connects the collector of transistor 128 in the astable multivibrator to ground, thereby prematurely switching the astable multivibrator to its condition in which transistor 128 is conductive.

The output of the transducer transmitting and receiving circuits 100 is taken from the junction between collector load resistors 132 and 134 in the astable multivibrator section. Although the voltage at the collector of transistor 128 is somewhat attenuated at the junction by virtue of the voltage divider action, the output driving impedance is thereby made advantageously low.

As can be seen in FIGURE 5, one side of the transducer 66 is connected to the collector of transistor 128 in the astable multivibrator section and the other side to electrical ground.

In operation of the electrical circuit of FIGURE 5, when the power source connected to terminal 120 energizes the transducer transmitting and receiving circuits 100, the astable multivibrator section will assume one of its two conditions. The "on" time, or duration of conduction, for transistor 128 is dictated by the time constant of resistor 140 and capacitor 142, and the "off" time, or duration of non-conduction, of transistor 128 is dictated by the time constant of resistor 136 and capacitor 137. When the astable multivibrator is in the state in which transistor 128 is conductive, and transistor 130 is non-conductive, the negative pulse then existing at the collector of transistor 128 is applied to crystal transducer 66 to cause the transducer to vibrate at its resonant frequency and to launch a pulse of acoustical waves into the water. For best efficiency of operation, the conduction time of transistor 128, dictated by the time constant of resistance 140 and capacitance 142, is preferably made short compared to the period of vibration of the crystal transducer.

The spacing between transducer and reflector is selected in conjunction with the free-running frequency of the multivibrator so that the time required for the acoustical waves to travel from the transducer to the reflector and back to the transducer is short when compared to the times between which transistor 128 is rendered conductive by the natural frequency of change of the astable multivibrator. The reflected pulse of acoustical waves striking the crystal transducer produces a control pulse which is applied to the collector of transistor 128, which transistor is then in its non-conductive state. At this time the circuit of transistor 128 presents a relatively high impedance load at its collector, resulting in an unloaded received pulse being coupled through capacitors 142 and 146 to the first stage of amplification. The positive going portion of the control pulse produced by the transducer is of a sufficient value to be detected by the amplifier and to render transistor 150 conductive. This pulse is amplified by the transistor amplifier and coupled to the second stage of amplification. Transistor 168, which is normally conducting, is rendered non-conductive by the negative pulse input to the stage. Accordingly, a positive-going output at the collector of transistor 168 is produced, which is coupled to the third stage amplifier. The positive-going input applied to the third stage amplifier renders transistor 180 conductive, producing a negative pulse at the collector of transistor 128 in the astable multivibrator section, which is applied to the base of transistor 130 through capacitor 132. This feedback pulse renders transistor 130 non-conductive, thus rendering transistor 128 conductive. This change of state whereby transistor 128 becomes conductive generates a negative pulse at the collector of transistor 128 which is applied to crystal transducer 66 to produce deformation of the crystal and thereby to launch an acoustical wave into the water, as previously described. This cycle is repeated with a periodicity determined by the acoustical propagation time from transducer to reflector and back again, and hence by the acoustical velocity in the water.

The period of the free-running cycle of the astable multivibrator which occurs in the absence of control pulses is long compared with the time between emission of an acoustical pulse by the crystal transducer and application of the resulting control pulse to the multivibrator.

It will be observed that the apparatus for measuring the velocity of acoustical waves of the present invention using a signal transducer and reflector provides advantages over the prior art apparatus in that a simpler and more inexpensive structure, easily assembled and capable of trouble free operation, is provided. Moreover, it will be seen that the housing for the apparatus is of a construction which tends to reduce turbulence of flow of the water through the region of the transducer section when the housing is moving through the water. Also, the use of a single transducer and reflector provides a means of compensating for different directions of current flow between the transducer and reflector in that the acoustical waves traveling therebetween may be accelerated in one direction but are then retarded in the other.

While the invention has been described with particular reference to a specific embodiment thereof, it will be understood that it may be embodied in a large variety of forms different from the one specifically shown and described without departing from the scope and spirit of the invention as defined by the appended claims.

I claim:

1. Apparatus for measuring the velocity of acoustical waves in a fluid medium, comprising:
    an electro-acoustical transducer mechanically coupled to a fluid medium transmissive of acoustical energy;
    pulse generating means for generating a series of time-spaced electrical pulses and for applying them to said transducer to launch a series of correspondingly time-spaced acoustical pulses into said fluid medium;
    a convex reflector of acoustical energy;
    spacer means mounting said reflector in said fluid medium at a predetermined distance from said transducer and in the path of said acoustical pulses so as to reflect only a limited portion of the energy of each of said acoustical pulses from the convex surface of said reflector back to said transducer after the electrical pulse producing it is ended, thereby to produce an electrical control pulse from said transducer upon reception of each of said pulses of reflected energy by said transducer; and
    circuit means responsive to each of said control pulses for controlling the time of generation of the next succeeding electrical pulse of said series.

2. Apparatus in accordance with claim 1, in which said circuit means comprises electrical circuit means supplied with said control pulses for controlling said pulse generating means to produce therefrom an electrical pulse of said series a predetermined time after the occurrence of each of said control pulses, whereby the frequency of said electrical pulses of said series provides an indication of the velocity of acoustical energy in said medium.

3. Apparatus in accordance with claim 2, in which said pulse-generating means comprises means effective in the absence of said control pulses to generate electrical pulses with a time-spacing greater than the time-spacing of electrical pulses of said series when said control pulses are present, whereby production of initial electrical pulses is assured for starting-up or resuming operation of said apparatus.

4. Apparatus in accordance with claim 1, in which said transducer comprises a piezoelectric crystal having a resonant frequency high compared with the frequency of said electrical pulses of said series.

5. Apparatus in accordance with claim 1, in which said spacer means is pervious to said fluid medium for which the velocity of acoustical waves is to be measured, whereby said apparatus may be immersed in and moved through said fluid medium to measure said velocity at different locations in said medium.

6. Apparatus in accordance with claim 5, in which said spacer means is provided with openings on both sides of the region between said transducer and said reflector, said openings being located and configured so as to reduce turbulence of flow of said fluid through said region when said apparatus is moved through said fluid.

7. Apparatus in accordance with claim 1, comprising means for deriving an output signal having a frequency varying in accordance with variations in the frequency of said electrical pulses of said series.

8. Apparatus for measuring the velocity of acoustical waves in water, comprising:
    an elongated housing having one end providing a nose portion for proceeding the housing through the water, said housing defining a chamber therein;
    water inlet means comprising a generally inwardly turned portion of said nose portion providing an opening communicating with said chamber;
    water outlet means communicating with said chamber comprising ports extending through said housing and spaced from said water inlet means to cooperate with said water inlet means for reducing turbulence of water flowing through said chamber from said inlet means to said outlet means;
    an electro-acoustical transducer and an acoustical reflector mounted on said housing in spaced apart relation in said chamber so that water flowing between said inlet means and outlet means passes between said transducer and said reflector, said reflector being positioned in the path of propagation of acoustical pulses from said transducer so as to reflect said acoustical pulses back to said transducer;
    pulse generating means for generating a series of time-spaced electrical pulses and for applying them to said transducer to launch a series of correspondingly time-spaced acoustical pulses into said water, said transducer being responsive to acoustical pulses reflected back from said reflector to produce an electrical control pulse in response to each of said acoustical pulses of reflected energy;
    circuit means responsive to said control pulses for controlling said pulse generating means to produce therefrom an electrical pulse of said series at a predetermined time after the occurrence of each of said control pulses;
    means for deriving an output signal having a frequency varying in accordance with variations in the frequency of said electrical pulses of said series; and
    means for transmitting said output signal from said apparatus.

9. Apparatus in accordance with claim 8, in which said transmitting means comprises a modulator and a transmitter responsive to said output signal for transmitting a carrier wave modulated with said output signal; a buoy containing said modulator and said transmitter; insulated electrical conductor means connecting said means for deriving an output signal in said housing with said modulator and transmitter in said buoy and permitting free sinking of said housing in said water; and means for radiating said modulated carrier wave from said buoy.

References Cited by the Examiner
UNITED STATES PATENTS

| | | | |
|---|---|---|---|
| 2,738,172 | 3/1956 | Spiess et al. | |
| 2,756,404 | 7/1956 | Anderson et al. | 340—5 |
| 2,869,108 | 1/1959 | Smith | 340—2 |
| 3,028,749 | 4/1962 | Welkowitz | 73—32 |
| 3,098,993 | 7/1963 | Coop | 340—5 |
| 3,184,959 | 5/1965 | Suellentrop et al. | 73—53 |

CHESTER L. JUSTUS, *Primary Examiner.*

R. A. FARLEY, *Assistant Examiner.*